(12) United States Patent
Decarreau et al.

(10) Patent No.: US 9,277,450 B2
(45) Date of Patent: Mar. 1, 2016

(54) DETECTING A LEVEL OF USE IN A COMMUNICATIONS NETWORK

(75) Inventors: Guillaume Decarreau, Beijing (CN); Jing He, Beijing (CN); Markus Wimmer, Blaustein (DE)

(73) Assignee: Nokia Solutions and Networks Oy, Espoo (FI)

(*) Notice: Subject to any disclaimer, the term of this patent is extended or adjusted under 35 U.S.C. 154(b) by 5 days.

(21) Appl. No.: 13/985,617

(22) PCT Filed: Feb. 15, 2012

(86) PCT No.: PCT/EP2012/052620
§ 371 (c)(1),
(2), (4) Date: Aug. 15, 2013

(87) PCT Pub. No.: WO2012/110566
PCT Pub. Date: Aug. 23, 2012

(65) Prior Publication Data
US 2013/0324077 A1    Dec. 5, 2013

(30) Foreign Application Priority Data

Feb. 15, 2011  (WO) ............... PCT/CN2011/000231

(51) Int. Cl.
| | |
|---|---|
| *H04W 28/08* | (2009.01) |
| *H04W 48/06* | (2009.01) |
| *H04W 48/10* | (2009.01) |
| *H04W 72/04* | (2009.01) |

(52) U.S. Cl.
CPC .............. *H04W 28/08* (2013.01); *H04W 48/06* (2013.01); *H04W 48/10* (2013.01); *H04W 72/0486* (2013.01)

(58) Field of Classification Search
CPC ...... H04W 48/06; H04W 48/10; H04W 48/08
See application file for complete search history.

(56) References Cited

U.S. PATENT DOCUMENTS

| | | |
|---|---|---|
| 7,043,751 B1 | 5/2006 | Fischer et al. |
| 2006/0031563 A1 | 2/2006 | Sebire et al. ................. 709/232 |
| 2006/0176815 A1* | 8/2006 | Picot et al. .................... 370/235 |
| 2009/0088175 A1 | 4/2009 | Pelletier et al. |
| 2009/0193121 A1* | 7/2009 | Shin .............................. 709/225 |
| 2009/0201810 A1* | 8/2009 | Kazmi ............... H04L 12/5695 370/232 |
| 2011/0058480 A1* | 3/2011 | Dahlen ......................... 370/237 |
| 2013/0208696 A1* | 8/2013 | Garcia Martin et al. ...... 370/331 |

FOREIGN PATENT DOCUMENTS

| | | |
|---|---|---|
| CN | 101049033 A | 10/2007 |
| CN | 101124838 A | 2/2008 |

(Continued)

OTHER PUBLICATIONS

3GPP TSG-RAN WG3 Meeting #43, Prague, Czech Republic, Aug. 16-20, 2004, R3-041074, "Congestion Control for EDCH", Siemens, 4 pgs.

(Continued)

*Primary Examiner* — Vladimir Magloire
*Assistant Examiner* — Shantell L Heiber
(74) *Attorney, Agent, or Firm* — Harrington & Smith

(57) ABSTRACT

A level of use of a first radio resource is detected and a flag is set in system information if the level of use of the first radio resource is above a predetermined threshold. The system information is updated to the network.

24 Claims, 5 Drawing Sheets

(56) References Cited

FOREIGN PATENT DOCUMENTS

| | | |
|---|---|---|
| CN | 101137223 A | 3/2008 |
| CN | 101765176 A | 6/2010 |
| EP | 2 086 263 A1 | 8/2009 |
| JP | H0738938 A | 2/1995 |
| JP | H10313480 A | 11/1998 |
| JP | 2010273347 A | 12/2010 |
| JP | 2010541411 A | 12/2010 |
| JP | 2011501603 A | 1/2011 |
| WO | WO 2006/075951 A1 | 7/2006 |
| WO | WO 2008/023609 A1 | 2/2008 |
| WO | WO 2008/09310 A1 | 6/2008 |
| WO | WO 2009057032 A2 | 5/2009 |

OTHER PUBLICATIONS

3GPP TSG RAN WG3 Meeting #45, Shin-Yokohama, Japan, Nov. 15-19, 2004, R3-041502, "E-DCH: Detection and control of Iub/Iur congestion", Ercisson, 3 pgs.

Ericsson; "AICH-based resource allocation signaling in Enhanced CELL_FACH"; R1-080410; 3GPP TSG RAN WG1 Meeting #51bis, Sevilla, Spain, Jan. 14-18, 2008; whole document (2 pages).

\* cited by examiner

DETECTING A LEVEL OF USE IN A COMMUNICATIONS NETWORK

FIELD OF THE INVENTION

The invention generally relates to detecting a level of use in a communications network. More particularly, the invention relates to balancing the load in a network.

BACKGROUND OF THE INVENTION

Many high speed packet access (HSPA) evolution features have been introduced in 3GPP since 3GPP Release 7, which increase the sending signalling data rate as well as reducing the signalling delay. Enhanced CELL_FACH in Release 7 was introduced for the downlink to allow a mobile station or user equipment (UE) to support high speed downlink packet access (HSDPA) in CELL_FACH state, and which enables the UE to receive common and dedicated channel data on the HS-DSCH in a non CELL_DCH state. Enhanced Uplink in CELL_FACH and CELL_PCH was introduced in 3GPP Release 8 for the uplink in order to allow the UE to support E-DCH in a CELL_FACH (and a CELL_PCH) state; i.e. the UE can send data over E-DCH instead of the RACH.

Nowadays, more mobile stations support Enhanced CELL_FACH and Enhanced Uplink in CELL_FACH and CELL_PCH features. If the Enhanced CELL_FACH/Enhanced Uplink in CELL_FACH and CELL_PCH features are enabled in a network and supported by mobile stations accessing the network, these mobile stations in IDLE mode or a non CELL_DCH state use Enhanced Uplink in CELL_FACH and CELL_PCH to access the network instead of legacy 3GPP Release 99 access (RACH), when a service is initiated.

However, overloading can occur if too many mobile stations use the Enhanced Uplink in CELL_FACH and CELL_PCH to access the network.

SUMMARY OF THE INVENTION

Accordingly, the invention provides a method, which includes detecting a level of use of a first radio resource in a communications network, setting a flag in system information if the level of use of the first radio resource is above a predetermined threshold, and updating the system information to the network. When the system information is updated, the network learns about the setting of the flag; i.e., whether or not the flag has been set in the system information.

By "flag" it is meant one or more bits, or a bit stream, introduced in system information. If the flag is set; i.e., the system information includes these particular one or more bits, the network is informed that the first radio resource is above a predetermined level. In this case the network can request that the first radio resource is not used by subscriber stations or that the first radio resource usage is restricted. This provides the advantage of efficiently balancing radio resources in the network and allows for higher radio resource efficiency. The flag may also be stored or read and stored in one variable.

If the flag is set, this may also indicate that a level of use of a second radio resource is below a predetermined threshold so that the second radio resource can be efficiently used instead of the first radio resource. In one embodiment, a condition for the flag to be set may be that the level of use of the first radio resource is equal to or above a predetermined threshold and the level of use of the second radio resource is equal to or below another predetermined threshold (with the thresholds being set by the network operator).

Preferably, the first radio resource is selected if the flag in the updated system information is not set and a second radio resource is selected if the flag in the updated system information is set. This provides the advantage of preventing overload of the first radio resource, since the second radio resource may be used instead if the flag indicating that the level of use of the first radio resource has reached or exceeded a set or configured predetermined level.

Access by a subscriber station to the first radio resource may also be restricted if the flag in the updated system information is set. In this way, subscriber stations in the network may be prevented from further overloading the first radio resource if the level of use has reached the predetermined level.

Subscriber station access to the first radio resource may be restricted using several different means.

For example, access may be restricted to a predetermined class of subscriber station if the flag is set.

In this case, an indication may be provided of the class of the subscriber station to which access to the first radio resource is restricted.

Alternatively, or in addition, access may be restricted by drawing a random number at the subscriber station. If the random number is below a predetermined threshold, the subscriber station may not use the first radio resource but can use a second radio resource instead.

Alternatively, access may be restricted to the first radio resource by transmitting a specified radio resource control message, for example a connection request, or a set of specified radio resource control messages on a second radio resource and transmitting other user data on the first radio resource.

Access to the first radio resource may also be restricted by allowing a subscriber station to transmit data on the first radio resource only if the data fits into a single message frame of a channel. If the data is larger than the single message frame, the subscriber station can instead transmit the data on a second radio resource.

For example, if the flag is set, it can indicate to the UE that each RRC message, e.g. for the RRC Connection Request or for the Cell Update, (if it fits completely into the PRACH/FACH message part) has to be transmitted by a legacy Release 99 common channel access, while any other user data has to be transmitted using a common E-DCH to access.

The invention further provides a network node configured for communication using a first radio resource and a second radio resource in a communications network. The network node includes a detector for detecting a level of use of the first radio resource. A processor is provided for setting a flag in system information if the level of use exceeds a predetermined and a transmitter is configured to update the system information to the network. This provides the advantage that it can easily be detected if the first radio resource is overloaded and the load balance between the first radio resource and the second radio resource can then be adjusted accordingly. In this way, a higher radio resource efficiency can be achieved. For example, the first radio resource may be channels used for Enhanced Uplink in CELL_FACH and CELL_PCH and the second radio resource may be 3GPP Release 99 random access channels. If the resources allocated to the feature Enhanced Uplink in CELL_FACH and CELL_PCH are becoming overloaded, Release 99 random access resources may be efficiently used instead.

In one embodiment, the processor only sets the flag if the level of use of the first radio resource is above a predetermined threshold and a level of use of the second radio resource is below a predetermined threshold.

The network node may be a control node, for example a radio network controller (RNC), or an access node, for example a base station or Node B. In the case where the network node is an RNC, the RNC can detect an overload of common channels used by the feature Enhanced Uplink in CELL_FACH and CELL_PCH in one cell or on common Iub resources, for example, and then set the flag or flags in the system information accordingly. Alternatively, if the network node is a Node B, it may independently set the flag or flags on a broadcasted resource under its control (for example the SIB7).

In one embodiment, the flag, when set, is configured to indicate to a subscriber station that it may only use a second radio resource. In this way, if the flag is set and indicates to the subscriber station that the level of use of the first radio resource has reached a predetermined level, the subscriber station may switch to a second radio resource. This provides the advantage of avoiding overload of the first radio resource, as well as a more efficient load balancing between radio resources in the network.

In another embodiment, the flag, when set, is configured to indicate that a restricted class of subscriber station may only use a second radio resource. To this end, an indication of this class of subscriber station may be sent from the network node in combination with the flag when set and the transmitter can be further configured to send the indication of the restricted class of subscriber station. Subscriber station or user equipment (UE) classes could be, for example, UE access class, UE access service class, UE supporting M2M communications only user class.

The flag may be configured to indicate a threshold. If a subscriber station draws a random number, when the random number is above the threshold, the subscriber station is allowed to use the first radio resource and if the random number is equal to or below the threshold, the subscriber station must use a second radio resource.

In a further embodiment, the flag, when set, may be configured to indicate that the subscriber station should transmit a specified radio resource control message, for example a connection request, or a set of specified radio resource control messages on a second radio resource and may transmit user data on the first radio resource. Furthermore, multiple flags may be set in the system information. For example, one flag for each RRC control message may exist, which, if set, indicates that the second radio resource shall be used; for example, Release 99 common channel access. In this case there is one flag for the RRC Connection Request message and one flag for the CELL UPDATE message.

Alternatively and/or additionally, the flag, when set, can be configured to indicate that a subscriber station may transmit data on the first radio resource if the data fits into a single message frame of a channel. Otherwise the data may be transmitted on the second radio resource instead of the first radio resource.

The invention provides subscriber station configured for communication using a first radio resource and a second radio resource. The subscriber station includes a receiver configured to receive system information including a flag which, if set, indicates that a level of use of the first radio resource exceeds a predetermined threshold. A processor is configured to update the system information so as to learn about the setting of the flag. For example, the subscriber station in a non-CELL_DCH state may be required to update the system information so as to learn about the setting of the flag or flags. In this way, the subscriber station can learn if the level of use of the first radio resource has reached a predetermined level and carry out efficient load balancing between radio resources accordingly.

Preferably, a switch is provided, which is configured to select the first radio resource if the flag is not set and configured to select the second radio resource if the flag is set. The switch can be configured to select the first or the second radio resource upon initiation of an activity or service, including signalling, for example a simple cell update. In this way, the subscriber station can use a second radio resource if the level of use of the first radio resource has reached a predetermined level, providing the advantage of avoiding radio resource overload and efficient load balancing of network resources.

The subscriber station may also include a memory configured to store the flag. Furthermore, the subscriber station may be configured to read and store the flag in one variable.

In a further aspect of the invention, a computer program product is provided. The computer program product includes a program comprising software code portions being arranged, when run on a processor, to perform the steps of detecting a level of use of a first radio resource in a communications network, setting a flag in a system information if the level of use of the first radio resource is above a predetermined threshold, and updating the system information to the network.

The computer program product may include a computer-readable medium on which the software code portions are stored, and/or wherein the program is directly loadable into a memory of the processor. The processor may be provided in a network node, for example an RNC or a Node B.

The invention will now be described, by way of example only, with reference to specific embodiments, and to the accompanying drawings, in which:

DETAILED DESCRIPTION OF EXEMPLARY EMBODIMENTS

Figure 1:
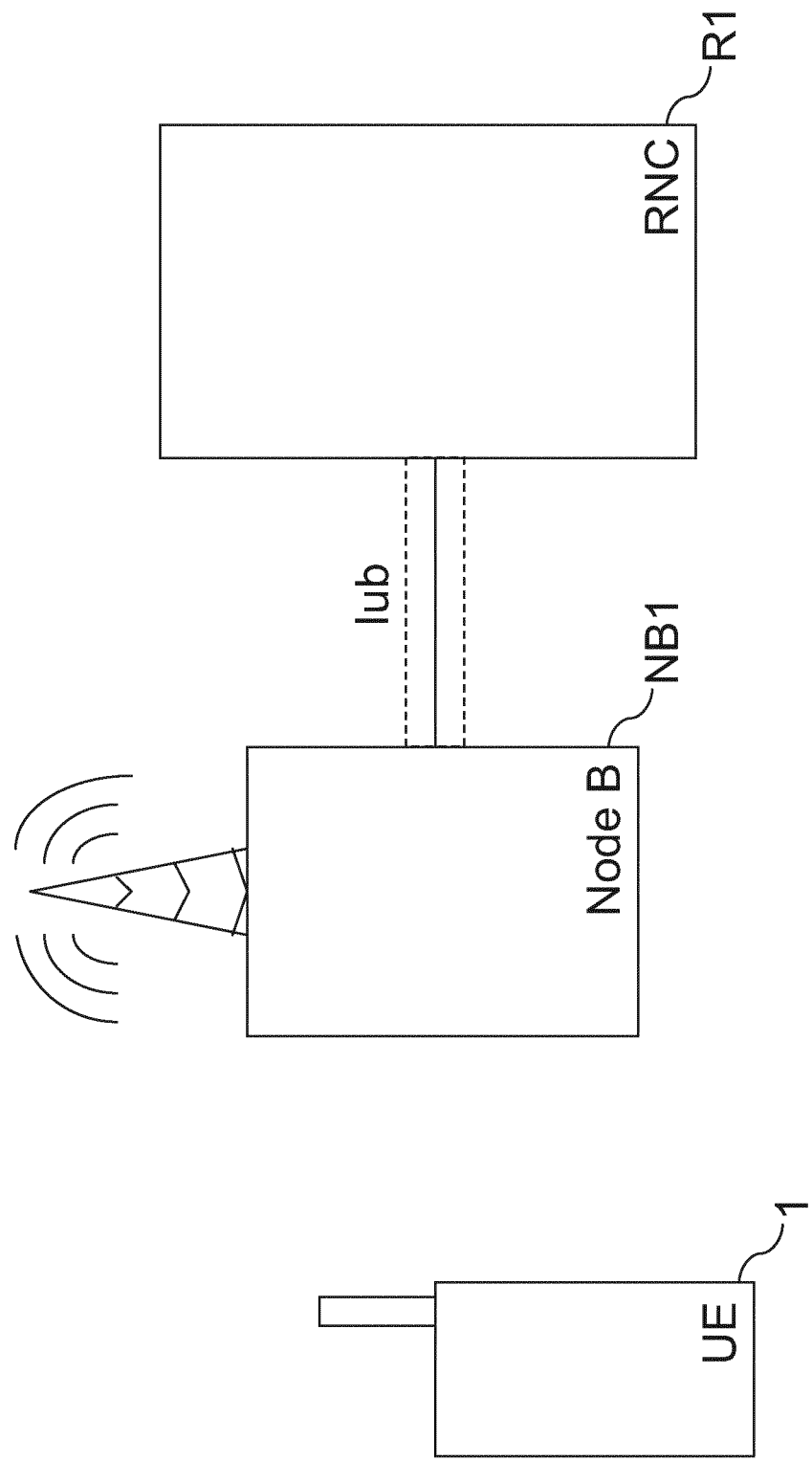
FIG. 1 is a simplified schematic diagram of a communications network according to an embodiment of the invention.

FIG. 1 shows the radio access network (RAN) part of a communications network. In the following examples, a UTRAN network is described and illustrated. However, the embodiments of the invention may apply to any wireless communications network, for example an LTE network.

Figure 2:
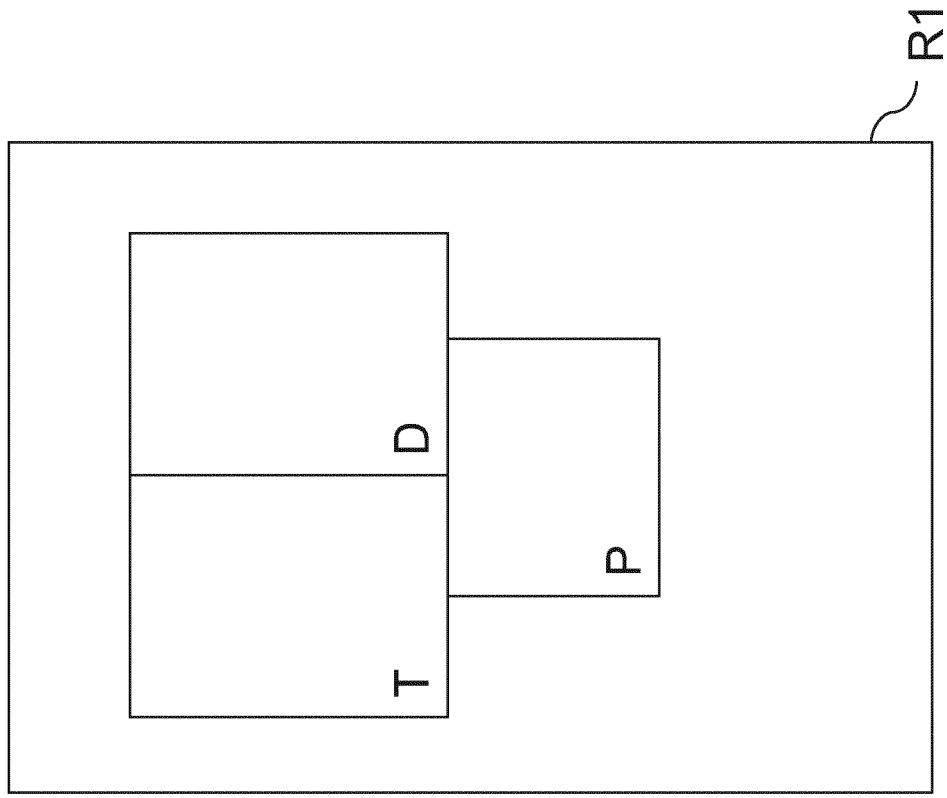
FIG. 2 is a simplified schematic diagram of a network node according to an embodiment of the invention.

The network includes a Node B NB1 controlled by a radio network controller (RNC) R1 over an Iub interface. The RNC R1 is shown in FIG. 2 and includes a transmit/receive unit including a transmitter T. The RNC R1 further includes a detector D for detecting a level of use of the common E-DCH and RACH radio resource and a processor P for setting a flag in system information if the level of common E-DCH and RACH use detected exceeds a certain level set by the network.

A subscriber station or user equipment (UE) 1 may access the network via the Node B NB1. The UE 1 is capable of using the high speed random access channel defined in the feature Enhanced Uplink in CELL_FACH and CELL_PCH in the uplink, as well as legacy (3GPP Release 99) RACH transmission. When the UE 1 uses the feature Enhanced Uplink in CELL_FACH and CELL_PCH for uplink data transmission, then this provides the benefit that the UE 1 can easily transmit data of several hundred bytes in a CELL_FACH state. It would take significantly longer to send this data via the CELL_DCH state, since a state transmission from the CELL_FACH state has to occur, which can take approximately 100 to 200 ms. Also the signaling overhead for state transition is avoided when the data can be sent in CELL_FACH state. To transmit pieces of data of several hundreds of bytes is also very inefficient with the legacy RACH, as the capacity on PRACH/RACH is very limited. As a consequence the data has to be segmented and transmitted in smaller pieces. Multiple random accesses to transmit the user data therefore would take quite some time using the legacy channels.

The UE 1, which supports Enhanced Uplink in CELL_FACH and CELL_PCH, also uses Enhanced Uplink in CELL_FACH and CELL_PCH for control signaling such as CELL_UPDATE (incl. cell change or periodic updates), RRC CONNECTION REQUEST, etc. These control messages are in general small enough that they can be conveyed in the message part of a single PRACH/RACH transmission. In this case, the transmission of the user data can be done almost equally fast using the Release 99 random access or Enhanced Uplink in CELL_FACH and CELL_PCH.

Figure 3:
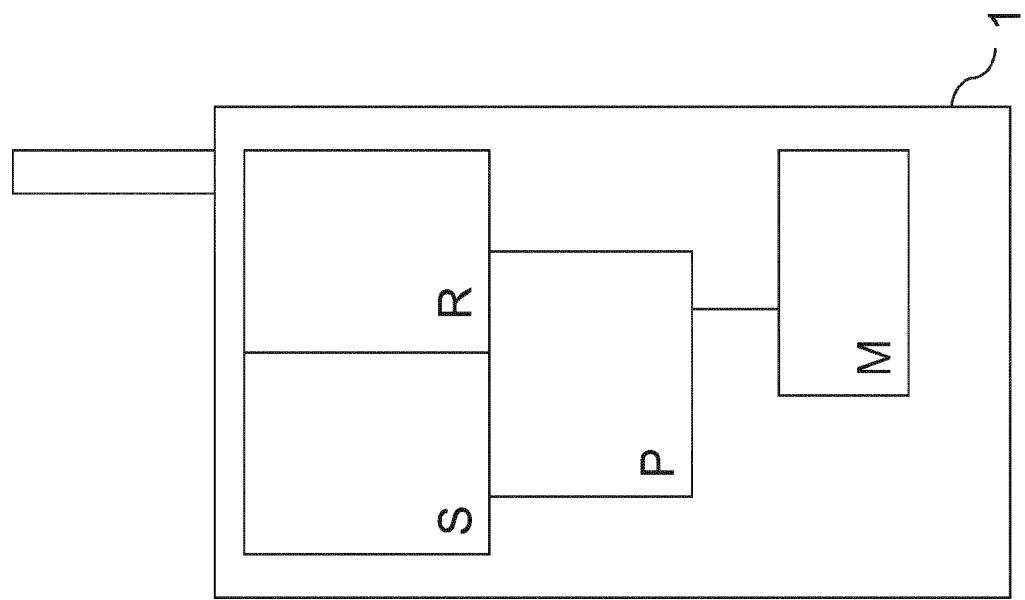
FIG. 3 is a simplified schematic diagram of a subscriber station according to an embodiment of the invention.

The UE 1 is shown in more detail in FIG. 3 and has a transceiver unit including a receiver R. The UE 1 also includes a processor Panda switch S, which allows the UE 1 to switch between different radio resources; i.e., Enhanced Uplink in CELL_FACH and CELL_PCH and legacy random access (RACH) radio resources. A memory M is configured to store system information updated to the UE 1 by the network.

A flag or flags are introduced into the System Information (BCCH) by the RNC R1 to inform Enhanced Uplink in CELL_FACH and CELL_PCH capable UEs that for load balance reasons the network would request the UE 1 to use the Enhanced Uplink in CELL_FACH and CELL_PCH procedure and/or the 3GPP Release 99 common channel access (RACH) for user and/or control data transmission.

Figure 4:
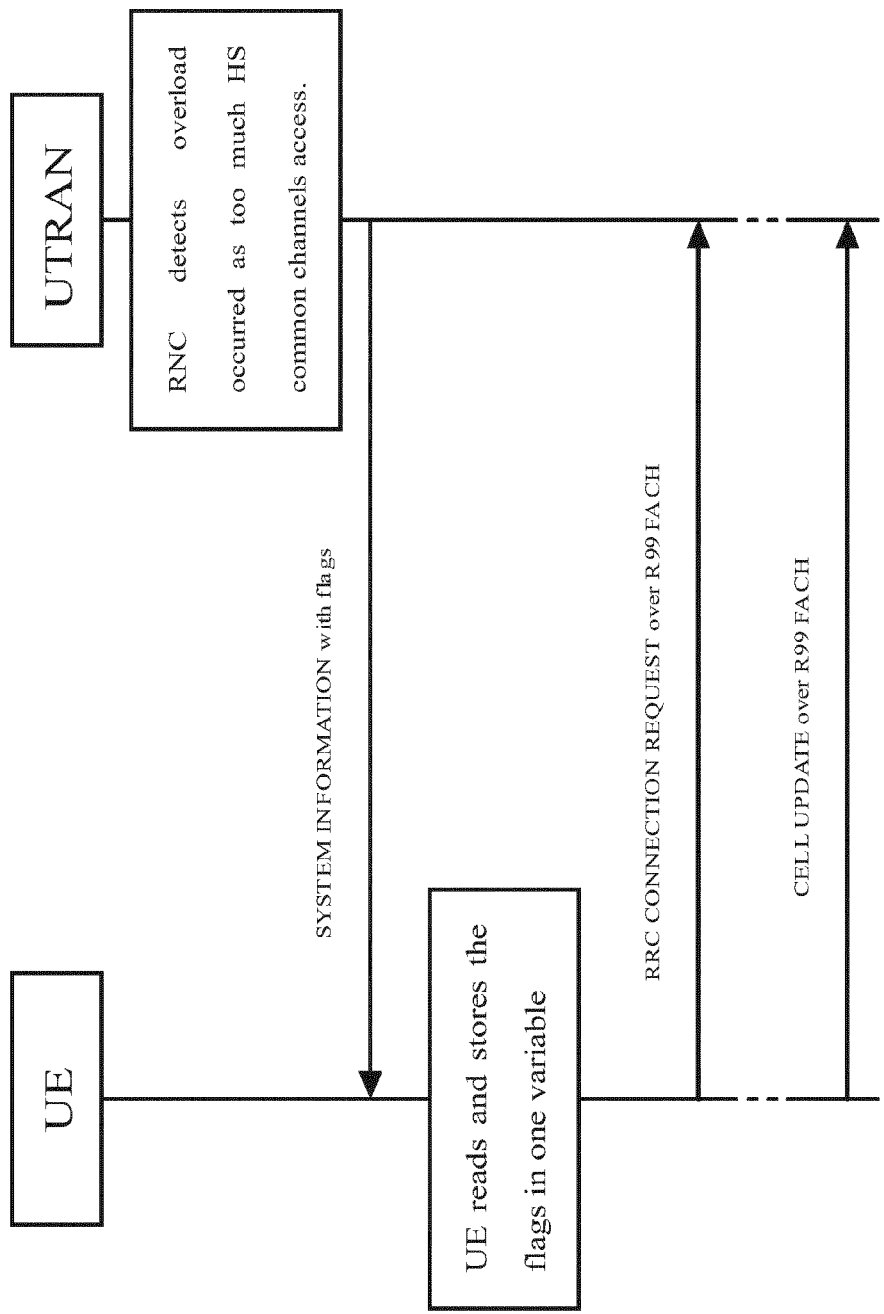
FIG. 4 is a message flow diagram illustrating a method according to an embodiment of the invention.
Figure 5:
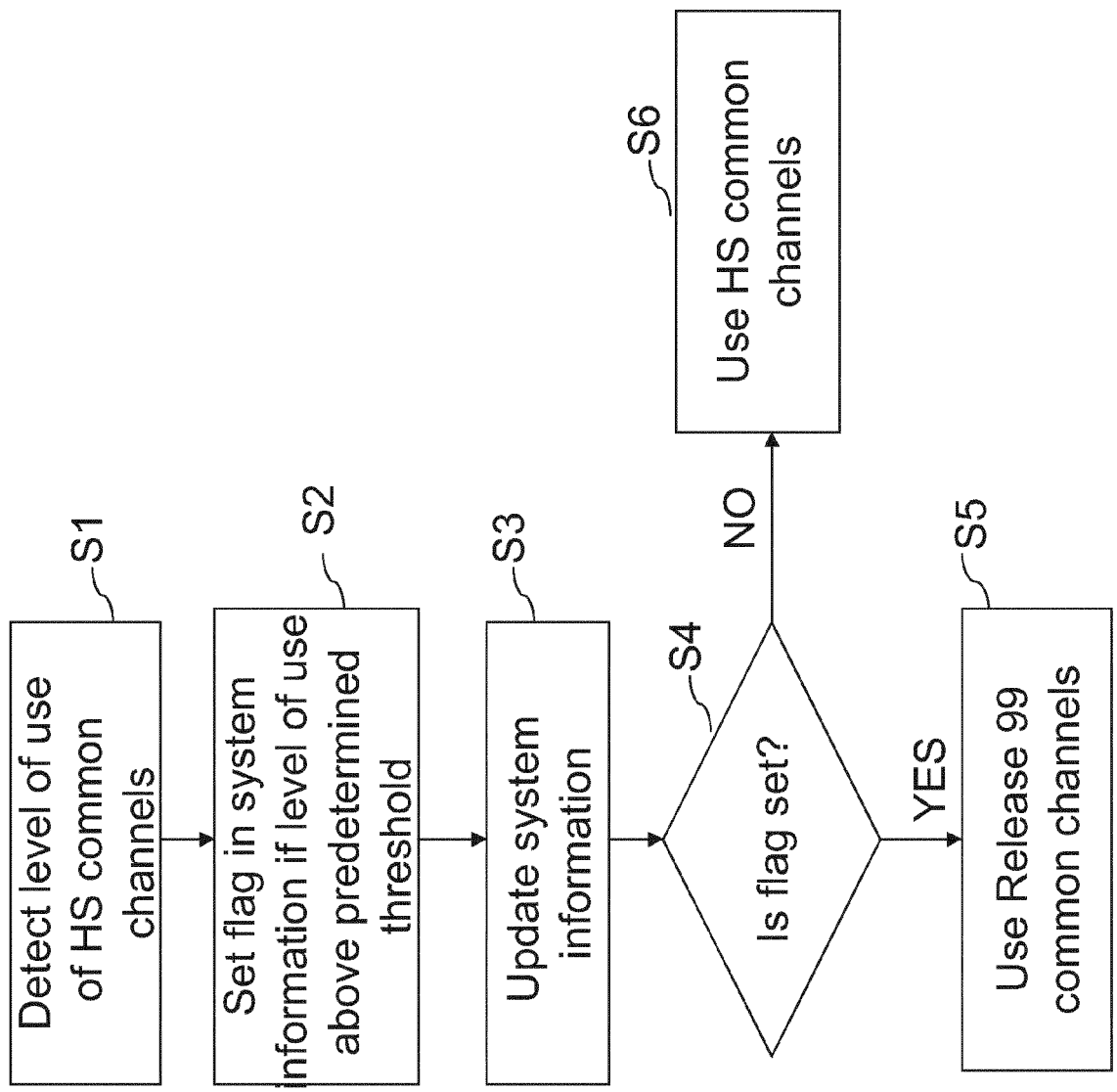
FIG. 5 is a flow diagram illustrating a method according to an embodiment of the invention.

Load balancing of radio resources during network operation is shown in the message flow diagram in FIG. 4 and in the flow diagram in FIG. 5.

In step S1, if there is an overload on the resources allocated to the feature Enhanced Uplink in CELL_TACH and CELL_PCH, the RNC R1 detects the overload of common E-DCH channels in one cell or on common Iub resources when the level of use of the common E-DCH channels exceeds a predetermined threshold set by the network. If such an overload is detected by the RNC R1, the RNC R1 sets a flag or flags in the system information in step S2. The flag is a bit stream that can take multiple values and the RNC R1 sets the flag or flags in the system information (BCCH) by including a bit or bit sequence having a particular value in the system information. In step S3 the system information is sent from the RNC R1 to the network and the UE 1 reads and stores the flag in one variable and updates the system information. UEs in a non-CELL_DCH are required to update the system information and thus learn about the setting of the flag(s). According to whether or not the flag is set (step S4), the UE 1 selects the Release 99 common channel or uses the feature Enhanced Uplink in CELL_FACH and CELL_PCH to access accordingly. For example, if the flag is set in step S4, the UE 1 selects the Release 99 RACH when a service is initiated to send the RRC Connection Request and the CELL UPDATE messages (step S5). If the flag is not set, the UE1 selects feature Enhanced Uplink in CELL_FACH and CELL_PCH when the service is initiated (step S6).

In one embodiment, if the flag is set, it restricts the UE 1 to the use R99 common channel access network only and if the flag is not set, it restricts the UE 1 to use the common channel access network given with feature Enhanced Uplink in CELL_FACH and CELL_PCH only.

In one embodiment, the RNC R1 sends a UE class indication. If the flag is set, in combination with the UE class indication, it restricts a class of UEs to use R99 common channel access only. Examples of UE classes are UE access class, UE service access classes, UE supporting M2M. communications only, user class.

In one embodiment, if the flag is set, it indicates a threshold. The UE 1 draws a random number and if the randomly drawn number is below the threshold, the UE 1 has to use R99 common channel to access the network. If the randomly drawn number is equal or above the threshold, the UE 1 uses common channels of feature Enhanced Uplink in CELL_FACH and CELL_PCH to access the network.

In one embodiment, if the flag is set, it indicates to the UE 1 that each RRC message or a selected group of RRC messages, for example for RRC Connection request, for Cell Update has to be transmitted by legacy R99 common channel access if it fits completely into the PRACH/RACH message part, while any other data has to be transmitted with the common channels of feature Enhanced Uplink in CELL_FACH and CELL_PCH.

As an alternative, a flag may also exist for each RRC control message for which R99 common channel access shall be used. In other words, there is one flag for the RRC Connection Request message and another flag for the CELL UPDATE message. This allows a higher granularity for load distribution.

In one embodiment, if the flag is set, such as at one 1 bit in the system information or greater, it indicates that the UE can send any data as long as the data is small enough to fit into one RACH message frame.

The above alternatives for the meaning of setting of the flag may be employed alone or in combination with each other.

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and network devices, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

The terms "user equipment (UE)", "subscriber station" and "mobile station" described herein may refer to any mobile or stationary device including a mobile telephone, a portable computer, a mobile broadband adapter, a USB stick for enabling a device to access to a mobile network, etc.

Although the invention has been described hereinabove with reference to specific embodiments, it is not limited to these embodiments and no doubt further alternatives will occur to the skilled person that lie within the scope of the invention as claimed.

The invention claimed is:

1. A method, comprising:
   detecting a level of use of a first radio resource in a communications network;
   setting a flag in a system information if a second radio resource can be used instead of the first radio resource;
   updating said system information to the network; and
   requesting that access to the first radio resource by a user equipment be restricted if the flag in the updated system information is set, wherein restricting access comprises drawing a random number at the user equipment such that the user equipment must use a second radio resource if the random number is below a predetermined threshold.

2. The method according to claim 1, wherein setting the flag requires that use of a second radio resource is below a predetermined threshold.

3. The method according to claim 1, further comprising storing the flag.

4. The method according to claim 1, further comprising selecting the first radio resource if the flag in the updated system information is not set and selecting a second radio resource if the flag in the updated system information is set.

5. The method according to claim 1, wherein access is restricted to a predetermined class of user equipment if the flag is set.

6. The method according to claim 5, wherein restricting access comprises providing an indication of the class of the user equipment.

7. The method according to claim 1, wherein restricting access comprises transmitting a radio resource control message on a second radio resource and transmitting other data on the first radio resource.

8. The method according to claim 1, wherein restricting access comprises allowing the user equipment to transmit data on the first radio resource if the data fits into a single message frame of a channel.

9. An apparatus comprising:
   at least one processor;
   memory storing a program of instructions;
   wherein the memory storing the program of instructions is configured to, with the at least one processor, cause the apparatus to at least:
   detect a level of use of a first radio resource used for communication in a communications network;
   set a flag in system information a second radio resource is able to be used for the communication in the communications network, instead of the first radio resource; and
   control a transmitter to update the system information to the network and to send a request that access to the first radio resource by a user equipment in the network be restricted if the flag in the updated system information is set, wherein restricting access comprises drawing a random number at the user equipment such that the user equipment must use a second radio resource if the random number is below a predetermined threshold.

10. The apparatus according to claim 9, wherein the apparatus is further configured to set the flag if a level of use of the second radio resource is below a predetermined threshold.

11. The apparatus according to claim 9, wherein the apparatus is operating in a network node configured as a control node.

12. The apparatus according to claim 9, wherein the apparatus is operating in a network node configured as an access node.

13. The apparatus according to claim 9, wherein a set state of the flag, indicates to a user equipment that it may only use a second radio resource.

14. The apparatus according to claim 9, wherein a set state of the flag indicates that a restricted class of user equipment may only use a second radio resource.

15. The apparatus according to claim 14, wherein the apparatus is further caused to control the transmitter to send an indication of said class of user equipment.

16. The apparatus according to claim 14, wherein a set state of the flag indicates a threshold such that when a user equipment draws a random number, if the random number is above the threshold, the user equipment is allowed to use the first radio resource and if the random number is equal to or below the threshold, the user equipment must use the second radio resource.

17. The apparatus according to claim 14, wherein a set state of the flag indicates that the user equipment should transmit a radio resource control message on a second radio resource and may transmit other data on the first radio resource.

18. The apparatus according to claim 14, wherein a set state of the flag indicates that a user equipment may transmit data on the first radio resource if the data fits into a single message frame of a channel.

19. A user equipment comprising:
a receiver configured to receive system information including a flag, a set state of which indicates that a second radio resource can be used instead of a first radio resource; and
a processor configured to update the system information so as to determine the state of the flag,
wherein the receiver is further configured to receive a request that access to the first radio resource by the user equipment be restricted if the flag in the updated system information is set, wherein restricting access comprises drawing a random number at the user equipment such that the user equipment must use a second radio resource if the random number is below a predetermined threshold.

20. The user equipment according to claim 19, wherein a set state of the flag further indicates that a level of use of a second radio resource is below a predetermined threshold.

21. The user equipment according to claim 19, further comprising a switch configured to select the first radio resource if the flag is not set and configured to select the second radio resource if the flag is set.

22. The user equipment according to claim 19, further comprising a memory configured to store the flag.

23. The user equipment according to claim 19, wherein the switch is configured to select the first or the second radio resource upon initiation of a service.

24. A method comprising:
configuring a user equipment to use a first radio resource and a second radio resource;
receiving system information including a flag, a set state of which indicates that the second radio resource can be used instead of the first radio resource;
receiving a request that access to the first radio resource be restricted if the flag in the updated system information is set, wherein restricting access comprises drawing a random number at the user equipment such that the user equipment must use a second radio resource if the random number is below a predetermined threshold; and
updating the system information so as to determine the setting of the flag.

* * * * *